US008591967B2

(12) United States Patent
Andersen et al.

(10) Patent No.: US 8,591,967 B2
(45) Date of Patent: *Nov. 26, 2013

(54) BIODEGRADABLE CHEWING GUM COMPRISING AT LEAST ONE HIGH MOLECULAR WEIGHT BIODEGRADABLE POLYMER

(75) Inventors: Lone Andersen, Middelfart (DK); Helle Wittorff, Vejle Øst (DK)

(73) Assignee: Gumlink A/S (DK)

( * ) Notice: Subject to any disclaimer, the term of this patent is extended or adjusted under 35 U.S.C. 154(b) by 1384 days.

This patent is subject to a terminal disclaimer.

(21) Appl. No.: 10/528,927

(22) PCT Filed: Sep. 24, 2002

(86) PCT No.: PCT/DK02/00625
§ 371 (c)(1),
(2), (4) Date: Dec. 16, 2005

(87) PCT Pub. No.: WO2004/028266
PCT Pub. Date: Apr. 8, 2004

(65) Prior Publication Data
US 2006/0165842 A1  Jul. 27, 2006

(51) Int. Cl.
*A23G 4/00* (2006.01)
*A23G 4/08* (2006.01)
*A23G 4/02* (2006.01)

(52) U.S. Cl.
USPC .................................................. 426/3

(58) Field of Classification Search
USPC .................. 426/3, 6, 5, 4; 424/48, 440
See application file for complete search history.

(56) References Cited

U.S. PATENT DOCUMENTS

| | | |
|---|---|---|
| 2,007,965 A | 7/1935 | Ellis |
| 2,353,927 A | 10/1942 | Pickett |
| 2,635,964 A | 1/1951 | Hewitt |
| 3,262,784 A | 7/1966 | Bucher |
| 3,440,060 A | 4/1969 | Rife et al. |
| 3,800,006 A | 3/1974 | Katayama et al. |
| 4,057,537 A | 11/1977 | Sinclair |
| 4,317,838 A | 3/1982 | Cherukuri et al. |
| 4,329,369 A | 5/1982 | Tezuka |
| 4,525,363 A | 6/1985 | D'Ameilia |
| 4,671,967 A | 6/1987 | Patel et al. |
| 4,731,435 A | 3/1988 | Greene et al. |
| 4,753,805 A | 6/1988 | Cherukuri et al. |
| 4,882,168 A | 11/1989 | Casey et al. |
| 5,354,556 A | 10/1994 | Sparks |
| 5,424,081 A | 6/1995 | Owusu-Ansah et al. |
| 5,429,827 A | 7/1995 | Song et al. |
| 5,433,960 A * | 7/1995 | Meyers .................. 426/5 |
| 5,508,378 A * | 4/1996 | Ohara et al. ............ 528/354 |
| 5,523,098 A | 6/1996 | Synosky et al. |
| 5,530,074 A | 6/1996 | Jarrett et al. |
| 5,610,266 A | 3/1997 | Buchholz |
| 5,672,367 A | 9/1997 | Grijpma et al. |
| 5,866,179 A | 2/1999 | Testa |
| 6,013,287 A | 1/2000 | Bunczek et al. |
| 6,153,231 A | 11/2000 | Li et al. |
| 6,190,773 B1 | 2/2001 | Imamura et al. |
| 6,194,008 B1 | 2/2001 | Li et al. |
| 6,322,806 B1 | 11/2001 | Ream et al. |
| 6,441,126 B1 | 8/2002 | Cook et al. |
| 6,733,818 B2 | 5/2004 | Luo |
| 2001/0002998 A1 | 6/2001 | Ream et al. |
| 2001/0021373 A1* | 9/2001 | Zyck et al. .............. 424/48 |
| 2004/0115305 A1 | 6/2004 | Andersen et al. |
| 2004/0142066 A1 | 7/2004 | Andersen et al. |
| 2004/0146599 A1 | 7/2004 | Andersen et al. |
| 2004/0156949 A1* | 8/2004 | Andersen et al. .......... 426/3 |
| 2004/0180111 A1 | 9/2004 | Andersen et al. |
| 2005/0244538 A1 | 11/2005 | Andersen et al. |
| 2006/0051455 A1 | 3/2006 | Andersen et al. |
| 2006/0099300 A1 | 5/2006 | Andersen et al. |
| 2006/0121156 A1 | 6/2006 | Andersen et al. |
| 2006/0147580 A1 | 7/2006 | Nissen et al. |

FOREIGN PATENT DOCUMENTS

| | | |
|---|---|---|
| EP | 0 151 344 | 8/1985 |
| EP | 0 258 780 | 3/1988 |
| EP | 0 415 656 | 3/1991 |
| EP | 0427185 | 5/1991 |
| EP | 0 500 098 | 8/1992 |
| EP | 0 558 965 | 9/1993 |
| EP | 0 711 506 B1 | 5/1996 |
| EP | 1 066 759 | 1/2001 |

(Continued)

OTHER PUBLICATIONS

International Search Report; International Application No. PCT/DK/00625; Date of Completion International Search Report: May 9, 2003; Date of Mailing: Jun. 18, 2003; 2 pgs.
Manly et al., "Substances Capable of Decreasing the Acid Solubility of Tooth Enamel", J. Dent. Res., 1949, vol. 28, No. 2, pp. 160-171.
Martindale, The Extra Pharmacopoeia, 28th Edition, 1982, pp. 547-548.
Food and Drug Administration, CFR, Title 21, Section 172.615 as "Masticatory Substances of Natural Vegetable Origin".
Odian, G., "Principles of Polymerization", 3rd Edition, Wiley-Interscience, New York, NY 1991, pp. 17-19.
J. Dent. Res. vol. 28, No. 2; pp. 160-171; Apr. 1949.
U.S. Appl. No. 10/528,926, filed Dec. 16, 2005; Andersen et al.; "Chewing gum comprising at least two different biodegradable polymers".
U.S. Appl. No. 10/529,137, filed Sep. 6, 2005; Andersen et al.; "Gum base".
Ching, Chauncey, et al.; "Biodegradable Polymers and Packaging", Biodegradable Polymers and Packaging, (1993): p. 28-31.
Grijpma, Dirk W., et al., "(Co)polymers of L-lactide, 1" Macromolecules Chem. Phys. (1993): p. 1633-1647.

(Continued)

*Primary Examiner* — Humera Sheikh
*Assistant Examiner* — Saeeda Latham
(74) *Attorney, Agent, or Firm* — St. Onge Steward Johnston & Reens LLC

(57) ABSTRACT

The invention relates to a chewing gum comprising at least one biodegradable polymer, wherein the molecular weight of said polymer is at least 105000 g/mol (Mn). According to the invention, it has moreover been realized that this problem may be effectively dealt with by increasing the molecular weight of at least one of the biodegradable polymers in the chewing gum when compared to conventional chewing gum polymers and thereby increasing the robustness of the chewing gum with respect to softeners, emulsifiers and e.g. flavor.

2 Claims, 2 Drawing Sheets

(56) References Cited

FOREIGN PATENT DOCUMENTS

Figure 1:
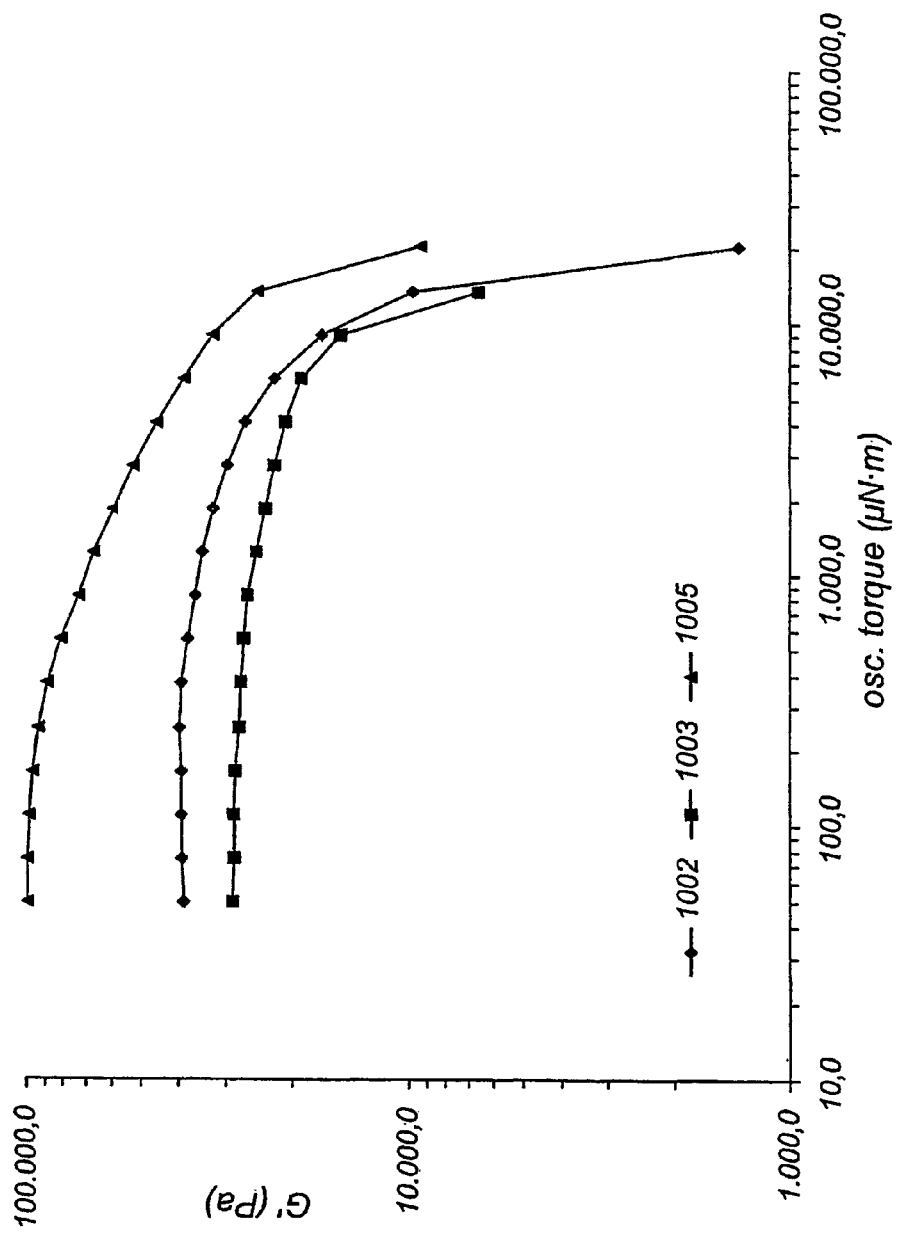

| | | |
|---|---|---|
| EP | 1 306 013 | 5/2003 |
| EP | 1354908 | 10/2003 |
| JP | 08-196214 | 8/1996 |
| JP | 09-047226 | 2/1997 |
| WO | WO 94/11441 | 5/1994 |
| WO | WO 94/14331 | 7/1994 |
| WO | 9417673 A1 | 8/1994 |
| WO | 2004028265 A1 | 8/1996 |
| WO | 9939588 A1 | 8/1999 |
| WO | WO 00/19837 | 4/2000 |
| WO | WO 00/25598 | 5/2000 |
| WO | WO 00/35296 | 6/2000 |
| WO | WO 00/35297 | 6/2000 |
| WO | WO 01/01788 | 1/2001 |
| WO | WO 01/47368 A1 | 7/2001 |
| WO | WO 01/54512 | 8/2001 |
| WO | WO 02/051258 | 7/2002 |
| WO | WO 02/076227 | 10/2002 |
| WO | WO 02/076228 | 10/2002 |
| WO | WO 02/076229 | 10/2002 |
| WO | WO 02/076230 | 10/2002 |
| WO | WO 02/076231 | 10/2002 |
| WO | WO 02/076232 | 10/2002 |
| WO | WO 2004/028265 | 4/2004 |
| WO | WO 2004/028267 | 4/2004 |
| WO | WO 2004/028268 | 4/2004 |
| WO | WO 2004/028269 | 4/2004 |
| WO | WO 2004/028270 | 4/2004 |
| WO | WO 2004/068965 | 4/2004 |
| WO | 2004028267 A1 | 8/2004 |
| WO | 2004028268 A1 | 8/2004 |
| WO | 2004028269 A1 | 8/2004 |
| WO | 2004028270 A1 | 8/2004 |
| WO | WO 2004/068964 | 8/2004 |

OTHER PUBLICATIONS

JP48-19950; Jun. 18, 1973; Translation (10 pages).
Preliminary Examination Report dated Dec. 3, 2004 for Application No. PCT/DK02/00625.
Notice of Opposition & Grounds of Opposition prepared by Mr. Colm Murphy; Application No. EP 02779228.2; May 13, 2009; 14 pages.
Hoseney, R. Carl; "Principles of Cereal Science and Technology"; USA: American Association of Cereal Chemists, 1994, Ed. 2. 3 pages.

* cited by examiner

BIODEGRADABLE CHEWING GUM COMPRISING AT LEAST ONE HIGH MOLECULAR WEIGHT BIODEGRADABLE POLYMER

FIELD OF THE INVENTION

The present invention relates to biodegradable chewing gum.

BACKGROUND OF THE INVENTION

U.S. Pat. No. 5,672,367 discloses a chewing gum made on the basis of a biodegradable polymer having polymeric properties, i.e. a polymer. A significant advantage, as explained in the patent, is that the resulting chewing gum may be degraded when disposed in the nature or e.g. on streets as a result of normal environmental influence. The disclosed chewing gum is claimed as having a structure and chewing characteristics comparable to those of chewing gum based on conventional, non-degradable polymers. It has moreover been realized, that the exchange of polymers provides a reduced tackness.

U.S. Pat. No. 6,153,231 discloses a chewing gum comprising a biodegradable polymer and where the polymer comprises a poly(lactic acid-dimer fatty acid oxazoline) copolymers or a poly(lactic acid-diol-urethane) copolymer.

A problem of the above disclosed chewing gums is that the biodegradable polymers as such does not simply replace the polymer or polymers of conventional chewing gum. It has been realized that the simple polymer substitution results in an overall chewing gum having different characteristics than conventional chewing gum. This problem indicates that the substituted polymer reacts differently with the remaining chewing ingredients than the biodegradable polymers thereby rendering conventional chewing gum formulations more or less useless.

It is an object of the invention to provide a biodegradable chewing gum capable of incorporating at least certain important chewing gum ingredients.

SUMMARY OF THE INVENTION

The invention relates to chewing gum comprising at least one biodegradable polymer, wherein the molecular weight of said at least one polymer is at least 105,000 g/mol (Mn).

According to the invention, it has been realized that chewing gums made on the basis of biodegradable polymers are somewhat vulnerable to different conventional chewing gum additives or components. Most critically, it has been realized that softeners, which are highly needed when obtaining the desired chewing gum texture, tend to dissolve the chewing gums even when applied in small amounts.

According to the invention, it has moreover been realized that this problem may be effectively dealt with by increasing of the molecular weight of at least one of the biodegradable polymers in the chewing gum when compared to conventional chewing gum polymers and thereby increasing the robustness of the chewing gum with respect to softeners, emulsifiers and e.g. flavor.

According to the invention, it has moreover been realized that an increasing of the molecular weight of at least one of the biodegradable polymers and thereby an increasing of the rheological stiffness (G') may in fact be more than compensated by addition of softeners.

In other words, according to the invention an improved texture of a biodegradable polymer containing chewing gum may in fact surprisingly be obtained by an initial worsening of the rheological properties of the biodegradable polymer and finally be more than compensated by the addition of suitable softeners.

Due to the hydrophilic nature of biodedegradable polymers, the polymers tends to swallow water, e.g. from mouth induced saliva. Thereby, the intermolecular forces between the neighboring molecular chains will decrease and the chewing gum structure will weaken.

According to the invention, a higher resistance to the decreasing of intermolecular forces has been obtained partly due to the fact that the resulting intermolecular forces are increased between the polymer chain and moreover due to the fact that the increasing of the size of the molecular chains results in increased entanglement between the polymer chains of neighboring polymers.

According to the invention, it has moreover been realized that an improved long-term release of chewing gum ingredients may be obtained, with increased molecular weight of the applied biodegradable polymer.

In an embodiment of the invention the molecular weight of said at least one biodegradable polymer is at least 150000 g/mol (Mn).

In an embodiment of the invention the molecular weight of said at least one biodegradable polymer is within the range of 105000 g/mol (Mn) to 1000000 g/mol (Mn).

According to the invention, it has been concluded that a sufficient amount of softeners may be added to a biodegradable polymer having a molecular weight of $M_n$=113,900 g/mol.

In an embodiment of the invention the molecular weight of said at least one biodegradable polymer is within the range of 105000 g/mol (Mn) to 500000 g/mol (Mn).

In an embodiment of the invention the molecular weight of said at least one biodegradable polymer is within the range of 105000 g/mol (Mn) to 350000 g/mol (Mn).

In an embodiment of the invention the molecular weight of said at least one biodegradable polymer is within the range of 105000 g/mol (Mn) to 250000 g/mol (Mn).

In an embodiment of the invention the molecular weight of said at least one biodegradable polymer is less than 2000000 g/mol (Mn).

In an embodiment of the invention the polydispersity of said at least one biodegradable polymer is within the range of 1 to 5.

In an embodiment of the invention the polydispersity of said at least one biodegradable polymer is within the range of 1 to 2.5 (2½).

In an embodiment of the invention the at least one biodegradable polymer comprises at least 25% of the chewing gum polymers, preferably at least 50%.

In an embodiment of the invention all the biodegradable polymers comprised in the chewing gum comprise at least 25%, preferably at least 50% of the chewing gum polymers.

In an embodiment of the invention all the biodegradable polymers comprised in the chewing gum comprise at least 80%, preferably at least 90% of the chewing gum polymers.

In an embodiment of the invention the chewing gum is substantially free of non-biodegradable polymers In an embodiment of the invention said chewing gum ingredients comprise flavoring agents.

In an embodiment of the invention said flavoring agents comprise natural and synthetic flavourings in the form of natural vegetable components, essential oils, essences, extracts, powders, including acids and other substances capable of affecting the taste profile In an embodiment of the invention said chewing gum comprise flavor in an amount of 0.01 to about 30 wt %, said percentage being based on the total weight of the chewing gum In an embodiment of the invention said chewing gum comprising flavor in an amount of 0.2 to about 4 wt %, said percentage being based on the total weight of the chewing gum In an embodiment of the invention said flavor comprises water soluble ingredients.

In an embodiment of the invention said water soluble flavor comprises acids.

According to the invention, a surprising initial release of acids has been obtained.

In an embodiment of the invention said flavor comprises water insoluble ingredients.

In an embodiment of the invention, said chewing gum ingredients comprise sweeteners.

In an embodiment of the invention said sweetener comprises bulk sweeteners In an embodiment of the invention the chewing gum comprises bulk sweeteners in an amount of about 5 to about 95% by weight of the chewing gum, more typically about 20 to about 80% by weight of the chewing gum.

In an embodiment of the invention the sweetener comprises high intensity sweeteners In an embodiment of the invention the high intensity sweeteners comprise sucralose, aspartame, salts of acesulfame, alitame, saccharin and its salts, cyclamnic acid and its salts, glycyrrhizin, dihydrochalcones, thaumatin, monellin, sterioside, alone or in combination In an embodiment of the invention wherein the chewing gum comprises high intensity sweeteners in an amount of about 0 to about 1% by weight of the chewing gum, more typically about 0.05 to about 0.5% by weight of the chewing gum.

In an embodiment of the invention, the chewing gum comprises at least one softener.

In an embodiment of the invention, the at least one softener comprises tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids, such as stearic, palmitic, oleic and linoleic acids mixtures thereof.

In an embodiment of the invention the chewing gum comprises softeners in an amount of about 0 to about 18% by weight of the chewing gum, more typically about 0 to about 12% by weight of the chewing gum.

In an embodiment of the invention, the chewing gum ingredients comprise active ingredients.

In an embodiment of the invention, said active ingredients are selected from the group of: Acetaminophen, Acetylsalicylic acid, Buprenorphine, Bromhexin, Celcoxib, Codeine, Diphenhydramin, Diclofenac, Etoricoxib, Ibuprofen, Indometacin, Ketoprofen, Lumiracoxib, Morphine, Naproxen, Oxycodon, Parecoxib, Piroxicam, Rofecoxib, Tenoxicam, Tramadol, Valdecoxib, Calciumcarbonat, Magaldrate, Disulfuram, Bupropion, Nicotine, Azithromycin, Clarithromycin, Clotrimazole, Erythromycin, Tetracycline, Granisetron, Ondansetron, Prometazin, Tropisetron, Brompheniramine, Ceterizin, leco-Ceterizin, Chlorcyclizine, Chlorpheniramin, Chlorpheniramin, Difenhydramine, Doxylamine, Fenofenadin, Guaifenesin, Loratidin, des-Loratidin, Phenyltoloxamine, Promethazin, Pyridamine, Terfenadin, Troxerutin, Methyldopa, Methylphenidate, Benzalcon, Chloride, Benzeth, Chloride, Cetylpyrid, Chloride, Chlorhexidine, Ecabet-sodium, Haloperidol, Allopurinol, Colchinine, Theophylline, Propanolol, Prednisolone, Prednisone, Fluoride, Urea, Miconazole, Actot, Glibenclamide, Glipizide, Metformin, Miglitol, Repaglinide, Rosiglitazone, Apomorfin, Clalis, Sildenafil, Vardenafil, Diphenoxylate, Simethicone, Cimetidine, Famotidine, Ranitidine, Ratinidine, cetrizin, Loratadine, Aspirin, Benzocaine, Dextrometorphan, Ephedrine, Phenylpropanolamine, Pseudoephedrine, Cisapride, Domperidone, Metoclopramide, Acyclovir, Dioctylsulfosucc, Phenolphtalein, Almotriptan, Eletriptan, Ergotamine, Migea, Naratriptan, Rizatriptan, Sumatriptan, Zolmitriptan, Aluminium salts, Calcium salts, Ferro salts, Silver salts, Zinc-salte, Amphotericin B, Chlorhexidine, Miconazole, Triamcinolonacetonid, Melatonine, Phenobarbitol, Caffeine, Benzodiazepiner, Hydroxyzine, Meprobamate, Phenothiazine, Buclizine, Brometazine, Cinnarizine, Cyclizine, Difenhydramine, Dimenhydrinate, Buflomedil, Amphetamine, Caffeine, Ephedrine, Orlistat, Phenylephedrine, Phenylpropanolamine, Pseudoephedrine, Sibutramin, Ketoconazole, Nitroglycerin, Nystatin, Progesterone, Testosterone, Vitamin B12, Vitamin C, Vitamin A, Vitamin D, Vitamin E, Pilocarpin, Aluminiumaminoacetate, Cimetidine, Esomeprazole, Famotidine, Lansoprazole, Magnesiumoxide, Nizatide and/or Ratinidine or derivates and mixtures thereof.

In an embodiment of the invention, the chewing gum is substantially free of non-biodegradable polymers In an embodiment of the invention the at least two or more cyclic esters are selected from the groups of glycolides, lactides, lactones, cyclic carbonates or mixtures thereof.

In an embodiment of the invention the lactone monomers are chosen from the group of $\epsilon$-caprolactone, $\delta$-valerolactone, $\gamma$-butyrolactone, and $\beta$-propiolactone. It also includes $\epsilon$-caprolactones, $\delta$-valerolactones, $\gamma$-butyrolactones, or $\beta$-propiolactones that have been substituted with one or more alkyl or aryl substituents at any non-carbonyl carbon atoms along the ring, including compounds in which two substituents are contained on the same carbon atom.

In an embodiment of the invention the carbonate monomer is selected from the group of trimethylene carbonate, 5-alkyl-1,3-dioxan-2-one, 5,5-dialkyl-1,3-dioxan-2-one, or 5-alkyl-5-alkyloxycarbonyl-1,3-dioxan-2-one, ethylene carbonate, 3-ethyl-3-hydroxymethyl, propylene carbonate, trimethylolpropane monocarbonate, 4,6dimethyl-1,3-propylene carbonate, 2,2-dimethyl trimethylene carbonate, and 1,3-dioxepan-2-one and mixtures thereof.

In an embodiment of the invention the cyclic ester polymers and their copolymers resulting from the polymerization of cyclic ester monomers include, but are not limited to: poly (L-lactide); poly (D-lactide); poly (D, L-lactide); poly (mesolactide); poly (glycolide); poly (trimethylenecarbonate); poly (epsilon-caprolactone); poly (L-lactide-co-D, L-lactide); poly (L-lactide-co-meso-lactide); poly (L-lactide-co-glycolide); poly (L-lactide-co-trimethylenecarbonate); poly (L-lactide-co-epsilon-caprolactone); poly (D, L-lactide-co-meso-lactide); poly (D, L lactide-co-glycolide); poly (D, L-lactide-co-trimethylenecarbonate); poly (D, L-lactide-co-epsilon-caprolactone); poly (meso-lactide-co-glycolide); poly (meso-lactide-co-trimethylenecarbonate); poly (meso-lactide-co-epsilon-caprolactone); poly (glycolide-cotrimethylenecarbonate); poly (glycolide-co-epsilon-caprolactone).

In an embodiment of the invention the chewing gum comprises filler.

A chewing gum base formulation may, if desired, include one or more fillers/texturisers including as exarnples, magnesium and calcium carbonate, sodium sulphate, ground limestone, silicate compounds such as magnesium and aluminium silicate, kaolin and clay, aluminium oxide, silicium oxide, talc, titanium oxide, mono-, di- and tri-calcium phosphates, cellulose polymers, such as wood, and combinations thereof.

In an embodiment of the invention the chewing gum comprises filler in an amount of about 0 to about 50% by weight of the chewing gum, more typically about 10 to about 40% by weight of the chewing gum.

In an embodiment of the invention the chewing gum comprises at least one coloring agent.

According to an embodiment of the invention, the chewing gum may comprise color agents and whiteners such as FD&C-type dyes and lakes, fruit and vegetable extracts, titanium dioxide and combinations thereof. Further useful chewing gum base components include antioxidants, e.g. butylated hydroxytoluene (BHT), butyl hydroxyanisol (BHA), propylgallate and tocopherols, and preservatives.

In an embodiment of the invention the chewing gum is coated with an outer coating.

In an embodiment of the invention the outer coating is a hard coating.

In an embodiment of the invention the hard coating is a coating selected from the group consisting of a sugar coating and a sugarless coating and a combination thereof.

In an embodiment of the invention the hard coating comprises 50 to 100% by weight of a polyol selected from the group consisting of sorbitol, maltitol, mannitol, xylitol, erythritol, lactitol and isomalt.

In an embodiment of the invention the outer coating is an edible film comprising at least one component selected from the group consisting of an edible film-forming agent and a wax.

In an embodiment of the invention the film-forming agent is selected from the group consisting of a cellulose derivative, a modified starch, a dextrin, gelatine, shellac, gum arabic, zein, a vegetable gum, a synthetic polymer and any combination thereof.

In an embodiment of the invention the outer coating comprises at least one additive component selected from the group consisting of a binding agent, a moisture absorbing component, a film forming agent, a dispersing agent, an anti-sticking component, a bulking agent, a flavouring agent, a colouring agent, a pharmaceutically or cosmetically active component, a lipid component, a wax component, a sugar, an acid and an agent capable of accelerating the after-chewing degradation of the degradable polymer.

In an embodiment of the invention the outer coating is a soft coating.

In an embodiment of the invention the soft coating comprises a sugar free coating agent.

In an embodiment of the invention the chewing gum comprises conventional chewing gum polymers or resins.

In an embodiment of the invention the at least one biodegradable polymer comprises at least 5% of the chewing gum polymers.

In an embodiment of the invention all the biodegradable polymers comprised in the chewing gum comprises at least 25%, preferably at least 50% of the chewing gum polymers.

In an embodiment of the invention the biodegradable polymers comprised in the chewing gum comprises at least 80%, preferably at least 90% of the chewing gum polymers.

In an embodiment of the invention the chewing gum comprises said at least one biodegradable polyester copolymer forming a plasticizer of the chewing gum and at least one non-biodegradable conventional elastomer.

According to the invention, a biodegradable polymer according to the invention may form a substitute of a conventional natural or synthetic resin.

In an embodiment of the invention the chewing gum comprises the at least one biodegradable polyester copolymer forming an elastomer of the chewing gum and at least one non-biodegradable conventional natural or synthetic resin.

According to the invention, a biodegradable polymer according to the invention may form a substitute of a conventional low or high molecular weight elastomer.

In an embodiment of the invention said chewing gum comprises at least one biodegradable elastomer in the amount of about 0.5 to about 70% wt of the chewing gum, at least one biodegradable plasticizer in the amount of about 0.5 to about 70% wt of the chewing gum and at least one chewing gum ingredient chosen from the groups of softeners, sweeteners, flavoring agents, active ingredients and fillers in the amount of about 2 to about 80% wt of the chewing gum.

In an embodiment of the invention edible polyesters may be applied as a degradable chewing gum polymer.

Edible polyesters are obtained by esterification of at least one alcohol and one acid.

The edible polyester is produced by condensation polymerization reaction of at least one alcohol chosen from the group of trihydroxyl alcohol and dihydroxyl alcohol, and at least one acid chosen from the group consisting of dicarboxylic acid and tricarboxylic acid.

It is possible to use edible or food grade materials. Because the starting acids and alcohols are food grade materials the resultant polymers is edible.

Alcohols: Glycerol, propylene glycol, 1,3 butylene diol

Acids: Citric acid, fumaric acid, adipic acid, malic acid, succinic acid suberic acid, sebacic acid, dodecanedioic acid, glucaric acid, glutamic acid, glutaric, azelaic acid, tartaric acid Edible polyesters can replace both elastomers and elastomer plasticizers and form 1-80% of the gum base.

DRAWINGS

The invention will now be described with reference to the drawings of which

Figure 2:
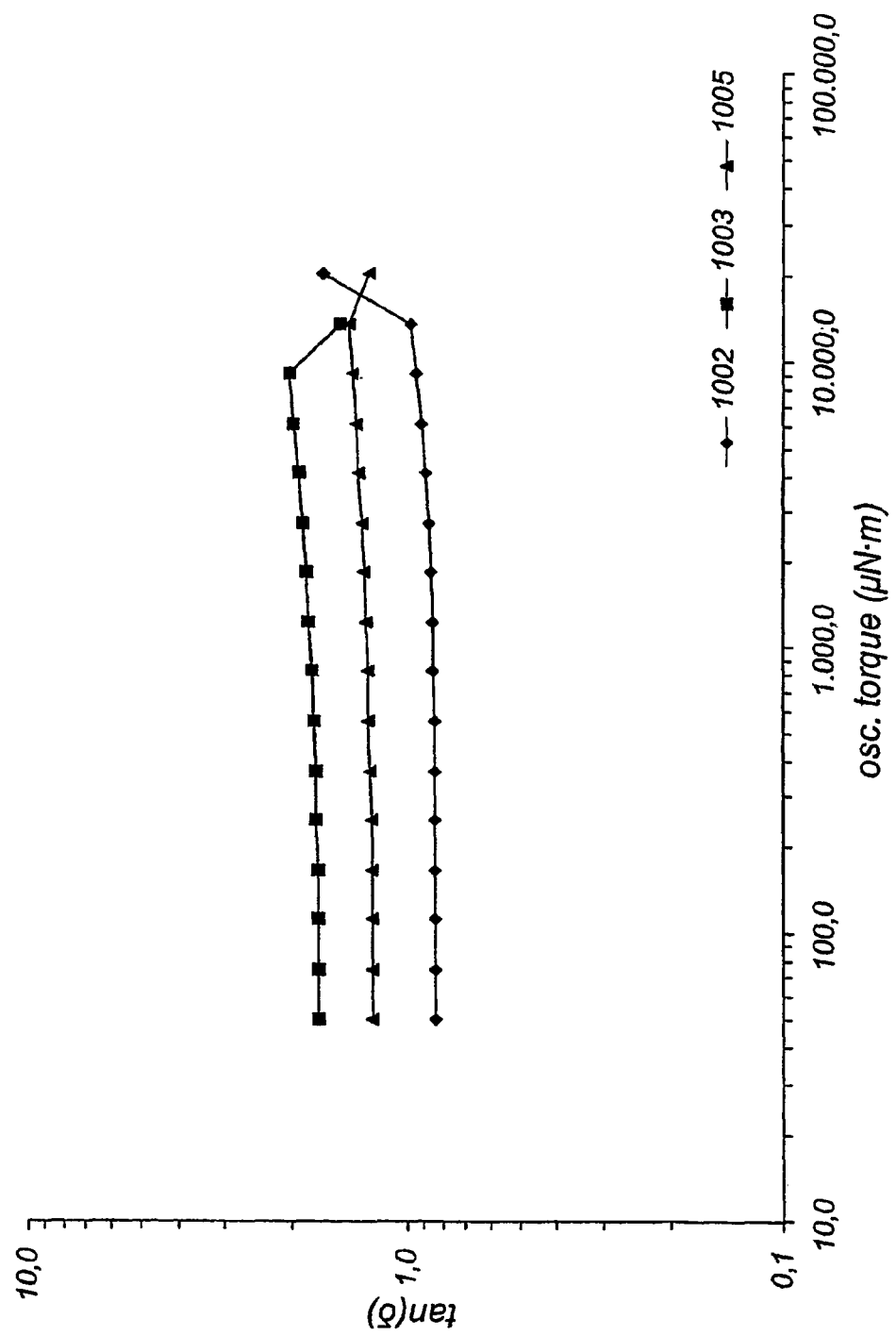

FIG. 1 illustrates G'(storage modulus) versus oscillation torque for chewing gums 1002, 1003 and 1005, all containing 3% lecithin and where FIG. 2 illustrates tan(delta) versus oscillation torque for chewing gums 1002, 1003 and 1005, all containing 3% lecithin.

DETAILED DESCRIPTION

In the present context the terms environmentally or biologically degradable polymer compounds refers to chewing gum base components which, after dumping the chewing gum, is capable of undergoing a physical, chemical and/or biological degradation whereby the dumped chewing gum waste becomes more readily removable from the site of dumping or is eventually disintegrated to lumps or particles which are no longer recognizable as being chewing gum remnants. The degradation or disintegration of such degradable polymers can be effected or induced by physical factors such as temperature, light, moisture, by chemical factors such as hydrolysis caused by a change in pH or by the action of enzymes capable of degrading the polymers. In other useful embodiments all of the polymer components of the gum base are environmentally degradable or biodegradable polymers.

Preferably, the ultimate degradation products are carbon dioxide, methane and water.

According to a preferred definition of biodegradability according to the invention biodegradability is a property of certain organic molecules whereby, when exposed to the natural environment or placed within a living organism, they react through an enzymatic or microbial process, often in combination with a pure chemical process such as hydrolysis, to form simpler compounds, and ultimately, carbon dioxide, nitrogen oxides, and water.

Accordingly, suitable examples of additional environmentally or biologically degradable chewing gum base polymers which can be applied in accordance with the gum base of the present invention include degradable polyesters, polycarbonates, polyester amides, polypeptides, homopolymers of amino acids such as polylysine, and proteins including derivatives hereof such as e.g. protein hydrolysates including a zein hydrolysate. Particularly useful compounds of this type include polyester polymers obtained by the polymerization of one or more cyclic esters such as lactide, glycolide, trimethylene carbonate, δ-valerolactone, β-propiolactone and ε-caprolactone. Such degradable polymers may be homopolymers or copolymers, including block-polymers.

Unless otherwise indicated, as used herein, the term "molecular weight" means number average molecular weight (Mn).

In the following examples, two different conventional chewing gumbases are made. The main difference between the two gumbases 101 and 102 of EXAMPLE 6 is the difference in molecular weight of the high molecular weight elastomer, i.e. the butylrubber.

The following examples are provided for the purpose of demonstrating the different properties of conventional and non-biodegradable elastomers when incorporated in a gumbase and a chewing gum formulation. The variable parameters, i.e. the molecular weight of the applied high molecular weight elastomers, and chewing gum ingredients has been kept low in order to highlight the actual difference between the chewing gums made on a conventional basis and chewing gum made on the basis of biodegradable polymers.

In EXAMPLE 6, gumbases 103 and 104 have been made by means of the same process, but the conventional high molecular weight elastomer has now been exchanged with a biodegradable substitute having almost the same molecular weight.

In the EXAMPLE 6, gumbase 105 has the molecular weight of the biodegradable high molecular weight elastomer has been further increased.

Example 1

Preparation of Resin

A resin sample was produced using a cylindrical glass, jacketed 10 L pilot reactor equipped with glass stir shaft and Teflon stir blades and bottom outlet. Heating of the reactor contents was accomplished by circulation of silicone oil, thermostated to 130° C., through the outer jacket. D,L-lactide (4.877 kg, 33.84 mol) was charged to the reactor and melted by heating to 140° C. for 6 h. After the D,L-lactide was completely molten, the temperature was reduced to 130° C., and stannous octoate (1.79 g, 4.42×10$^{-3}$ mol), 1,2-propylene glycol (79.87 g, 1.050 mol), and ε-caprolactone (290.76 g, 2.547 mol) were charged to the reactor. After the mixture became homogeneous, stirring was continued for 24 h at 130° C. At the end of this time, the bottom outlet was opened, and molten polymer was allowed to drain into a Teflon-lined paint can.

Characterization of the product indicated $M_n$, =5,700 g/mol and $M_w$=7,100 g/mol (gel permeation chromatography with online MALLS detector) and $T_g$=30.7° C. (DSC, heating rate 10° C./min).

Example 2

Preparation of LMWE Elastomer

A 515 g LMWE sample was synthesized within a dry $N_2$ glove box, as follows. Into a 500 mL resin kettle equipped with overhead mechanical stirrer, 0.73 g 1,2-propane diol (3.3 mL of a 22.0%(w/v) solution in methylene chloride), and 0.152 g Sn(Oct)$_2$ (3.56 ml of a 4.27% (w/v) solution in methylene chloride) were charged under dry $N_2$ gas purge. The methylene chloride was allowed to evaporate under the $N_2$ purge for 15 min. Then ε-caprolactone (300 g, 2.63 mol) and δ-valerolactone (215 gm. 2.15 mol) were added. The resin kettle was submerged in a 130° C. constant temperature oil bath and stirred for 14 h. Subsequently the kettle was removed from the oil bath and allowed to cool at room temperature. The solid, elastic product was removed in small pieces using a knife, and placed into a plastic container.

Characterization of the product indicated $M_n$=59,900 g/mol and $M_w$=74,200 g/mol (gel permeation chromatography with online MALLS detector) and $T_g$=-70° C. (DSC, heating rate 10° C./min).

Example 3

Preparation of HMVE

A HMWE sample according to the invention was synthesized in a dry $N_2$ glove box, as follows. Into a 500 mL resin kettle equipped with overhead mechanical stirrer was charged 0.037 g Sn(Oct)$_2$ (3.4 ml of a 1.10% (w/v) solution in methylene chloride) under dry $N_2$ gas purge. The methylene chloride was allowed to evaporate under the $N_2$ purge for 15 min. Then, pentaerythritol (0.210 g, 1.54×10$^{-3}$ mol), ε-caprolactone (79.0 g, 0.692 mol), TMC(8.0 g, 0.078 mol) and δ-valerolactone (38.0 g, 0.380 mol) were added. The resin kettle was submerged in a 130° C. constant temperature oil bath and stirred for 14 h. Subsequently the kettle was removed from the oil bath and allowed to cool at room temperature. The solid, elastic product was removed in small pieces using a knife, and placed into a plastic container.

Characterization of the product indicated $M_n$=64,600 g/mol and $M_w$=165,200 g/mol (gel permeation chromatography with online MALLS detector) and $T_g$=-66° C. (DSC, heating rate 10° C./min).

Example 4

Preparation of High HMWE

A HMWE sample was synthesized in a dry $N_2$ glove box, as follows. Into a 500 mL resin kettle equipped with overhead mechanical stirrer was charged 0.037 g Sn(Oct)$_2$ (2.4 ml of a 1.54% (w/v) solution in methylene chloride) under dry $N_2$ gas purge. The methylene chloride was allowed to evaporate under the $N_2$ purge for 15 min. Then, pentaerythritol (0.068 g, 4.99×10$^{-4}$ mol), ε-caprolactone (68.0 g, 0.596 mol), TMC (7.0 g, 0.069 mol), and δ-valerolactone (33.0 g, 0.33 mol) were added. The resin kettle was then submerged in a 130° C. constant-temperature oil bath and stirred for about 2- 2.5 h, at which time the mass solidified and could no longer be stirred.

The reacting mass was then maintained at 130° C. for an additional 11.5-12 h for a total reaction time of 14 h. Subsequently the kettle was removed from the oil bath and allowed to cool to room temperature. The solid, elastic product was removed in small pieces using a knife, and placed into a plastic container.

Characterization of the product indicated $M_n$=113,900 g/mol and $M_w$=369,950 g/mol (gel permeation chromatography with online MALLS detector).

Example 5

Preparation of a High HMWE

A 219 g HMWE sample was synthesized as follows in a dry $N_2$ glove box. Into a 500 mL resin kettle, equipped with overhead mechanical stirrer was charged Stannous ethoxide (0.077 g, 3.69×10$^{-4}$ mol), ∈-caprolactone (137 g, 1.2 mol), and TMC (82 g, 0.804 mol) were added. The resin kettle was then submerged in a 130° C. constant-temperature oil bath and stirred for 14 h. Subsequently the kettle was removed from the oil bath and allowed to cool to room temperature. The solid, elastic product was removed in small pieces using a knife, and placed into a plastic container.

Characterization of the product indicated $M_n$=254,900 g/mol (gel permeation chromatography with online MALLS detector).

Example 6

Preparation of Gumbases

All the gumbases are prepared with following basic formulation:

| Ingredients | Percent by weight |
| --- | --- |
| Elastomer HMWE | 20 |
| Elastomer LMWE | 40 |
| Resin | 40 |

TABLE 1

Gumbase preparation

| No | Type | Elastomer HMWE | Elastomer LMWE | Resin |
| --- | --- | --- | --- | --- |
| 101 | Standard | Polyisobutylene Mn = 73,000 | Polyisobutylene Mn = 30.000 | Polyvinylacetate Mn = 5000 |
| 102 | Standard | Butylrubber Mn = 117,000 | Polyisobutylene Mn = 30.000 | Polyvinylacetate Mn = 5000 |
| 103 | Biodegradable | Elastomer polymer from example 3 | Elastomer polymer from example 2 | Resin polymer from example 1 |
| 104 | Biodegradable | Elastomer polymer from example 4 | Elastomer polymer from example 2 | Resin polymer from example 1 |
| 105 | Biodegradable | Elastomer polymer from example 5 | Elastomer polymer from example 2 | Resin polymer from example 1 |

The gumbases are prepared as follows:
HMWE elastomer is added to a mixing kettle provided with mixing means like e.g. horizontally placed Z-shaped arms. The kettle had been preheated for 15 minutes to a temperature of about 60-80° C. The rubber is broken into small pieces and softened with mechanical action on the kettle.

The resin is slowly added to the elastomer until the mixture becomes homogeneous. The remaining resin is then added to the kettle and mixed for 10-20 minutes. The LMWE elastomer is added and mixed for 20-40 minutes until the whole mixture becomes homogeneous.

The mixture is then discharged into the pan and allowed to cool to room temperature from the discharged temperature of 60-80° C., or the gumbase mixture is used directly for chewing gum by adding all chewing gum components in an appropriate order under continuous mixing.

Example 7

Preparation of Chewing Gum

The gumbases listed in table 1 were mixed into a final chewing gum during addition of different chewing gum ingredients as illustrated in the table below.

TABLE 2

Preparation of chewing gum

| Parts (weight) | 1001 % | 1002 % | 1003 % | 1004 % | 1005 % | 1006 % | 1007 % |
| --- | --- | --- | --- | --- | --- | --- | --- |
| Gumbase | 40% of 101 | 40% of 102 | 40% of 103 | 40% of 103 | 40% of 104 | 40% of 104 | 40% of 105 |
| Sorbitol powder | 45.6 | 45.6 | 45.6 | 47.3 | 45.6 | 44.6 | 45.6 |
| Lycasin | 3 | 3 | 3 | 3 | 3 | 3 | 3 |
| Peppermint oil | 1.5 | 1.5 | 1.5 | 1.5 | 1.5 | 1.5 | 1.5 |
| Menthol (crystal) | 0.5 | 0.5 | 0.5 | 0.5 | 0.5 | 0.5 | 0.5 |
| Aspartame | 0.2 | 0.2 | 0.2 | 0.2 | 0.2 | 0.2 | 0.2 |
| Acesulfame | 0.2 | 0.2 | 0.2 | 0.2 | 0.2 | 0.2 | 0.2 |
| Xylitol | 6 | 6 | 6 | 6 | 6 | 6 | 6 |
| Fat | 0 | 0 | 0 | 0.3 | 0 | 4 | 0 |
| Lecithin | 3 | 3 | 3 | 1.0 | 3 | 0 | 3 |

The gum bases used in the above chewing gum formulations are relatively hard and the chewing gum system needs additional softening in order to get an acceptable texture.

The two standard formulation 1001 and 1002, containing HAVE elastomers with Mn of 73,000 and 117,000 showed improved texture with 3% lecithin. A biodegradable gum base (103) including a polymer with Mn of 65.000 (EXAMPLE 3) was tested in chewing gum with 3% lecithin (1003), the chewing gum became very soft, and it almost dissolved while chewing. The same gumbase (103) was used in a chewing gum formulation (1004) where the softening system comprises 1% lecithin and 0.3% fat, this formulation was also too soft.

It can therefore be concluded that the biodegradable gumbases appears to be less resistant to softeners and emulsifiers.

Chewing gum formulation 1005 and 1006 was prepared with a new biodegradable gumbase (104) containing a polymer with a higher Mn of 114.000 (EXAMPLE 4). When adding 3% lecithin or 4% fat the chewing gum has a pleasant and acceptable texture compared to conventional chewing gum formulations.

Chewing gum formulation 1007 was made with a biodegradable gumbase 105, where a polymer with Mn of 350,000 was used (EXAMPLE 5). When adding 3% lecithin the texture is harder but acceptable Hence, an increase of molecular weight results in an increased polymer resistance to chewing gum ingredients such as for instance softeners and fat.

Example 8

An experiment was set up in order to test different chewing gum formulations containing 3% lecithin.

1001 and 1002 are two standard formulations containing elastomers with Mn of 73,000 and 117,000.

1003 is a 100% biodegradable formulation containing elastomer polymer Mn of 65,000 and 1005 is a 100% biodegradable formulation containing elastomer polymer with Mn of 114,000.

The gum centres were chewed in a chewing machine (CF Jansson). The chewing frequency was set to 1 Hz, a pH buffer was used as saliva and the temperature was set at 37° C. The chewing time was set to 30 seconds. After chewing, the chewed cud was measured on a rheometer, type AR1000 from TA Instruments. The oscillation measurement is performed at a stress within the linear viscoelastic region and a temperature of 37° C. with a parallel plate system (d=2.0 cm, hatched). G', and tan delta vs. shear rate.

The results are summarized in FIG. 1 and FIG. 2, and as it appears, the biodegradable formulations containing 3% lecithin show different rheological behavior. The low Mn of 65,000 (1003) is very soft and less elastic compared to the formulation with high Mn (1005).

This is confirming the sensorial evaluation described in the above EXAMPLE 7.

The invention claimed is:

1. Chewing gum comprising:
   at least one biodegradable polymer having a molecular weight within the range of 105000 g/mol (Mn) to 350000 g/mol (Mn); and
   at least one softener in an amount of less than 12% by weight of the chewing gum;
   wherein the chewing gum is free of non-biodegradable polymers;
   wherein the at least one biodegradable polymer obtained by the polymerization of one or more cyclic esters by ring-opening and where at least one of the cyclic esters are selected from the groups consisting of glycolides, lactides, lactones, cyclic carbonates and mixtures thereof;
   wherein lactone monomers are chosen from the group consisting of $\epsilon$-caprolactone, $\delta$-valerolactone, $\gamma$-butyrolactone, $\beta$-propiolactone and mixtures thereof; and
   wherein the lactone monomers are optionally substituted with one or more alkyl or aryl substituents at any non-carbonyl carbon atoms along the ring, including compounds in which two substituents are contained on the same carbon atom.

2. Chewing gum comprising:
   at least one biodegradable polymer having a molecular weight within the range of 105000 g/mol (Mn) to 350000 g/mol (Mn); and
   at least one softener in an amount of less than 12% by weight of the chewing gum;
   wherein the chewing gum is free of non-biodegradable polymers;
   wherein the at least one biodegradable polymer obtained by the polymerization of one or more cyclic esters by ring-opening and where at least one of the cyclic esters are selected from the groups consisting of glycolides, lactides, lactones, cyclic carbonates and mixtures thereof; and
   wherein the carbonate monomer is selected from the group consisting of trimethylene carbonate, 5-alkyl-1,3-dioxan-2-one, 5,5-dialkyl-1,3-dioxan-2-one, or 5-alkyl-5-alkyloxycarbonyl-1,3-dioxan-2-one, ethylene carbonate, 3-ethyl-3-hydroxymethyl, propylene carbonate, trimethylolpropane monocarbonate, 4,6-dimethyl-1,3-propylene carbonate, 2,2-dimethyl trimethylene carbonate, 1,3-dioxepan-2-one and mixtures thereof.

\* \* \* \* \*